United States Patent
Chong et al.

(10) Patent No.: US 9,749,929 B2
(45) Date of Patent: Aug. 29, 2017

(54) METHOD FOR CONTROLLING USER EQUIPMENT TO ACCESS COMMUNICATIONS NETWORK OF HIGH-SPEED MOVING VEHICLE

(71) Applicant: Huawei Technologies Co., Ltd., Shenzhen, Guangdong (CN)

(72) Inventors: Weiwei Chong, Shanghai (CN); Xiaobo Wu, Shanghai (CN); Yangming Lv, Shanghai (CN); Changqing Geng, Xi'an (CN); Guobao Xi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/472,008

(22) Filed: Mar. 28, 2017

(65) Prior Publication Data

US 2017/0201925 A1    Jul. 13, 2017

Related U.S. Application Data

(63) Continuation of application No. PCT/CN2014/087811, filed on Sep. 29, 2014.

(51) Int. Cl.
*H04W 4/00* (2009.01)
*H04W 36/32* (2009.01)
*H04L 29/12* (2006.01)
*H04W 60/04* (2009.01)

(52) U.S. Cl.
CPC ........ *H04W 36/32* (2013.01); *H04L 61/1588* (2013.01); *H04W 60/04* (2013.01)

(58) Field of Classification Search
CPC ..................................................... H04W 36/32
USPC ....................................................... 455/435.2
See application file for complete search history.

(56) References Cited

U.S. PATENT DOCUMENTS

| | | | |
|---|---|---|---|
| 5,548,806 A * | 8/1996 | Yamaguchi | H04W 36/04 455/441 |
| 9,179,388 B2 * | 11/2015 | Yu | H04W 36/32 |
| 9,560,555 B2 * | 1/2017 | Guo | H04W 8/06 |
| 2011/0190010 A1 * | 8/2011 | Cho | H04W 60/04 455/458 |
| 2012/0128084 A1 * | 5/2012 | Aguirre | H04W 72/048 375/260 |

(Continued)

FOREIGN PATENT DOCUMENTS

| CN | 101583169 | * 11/2009 | ............ H04W 36/00 |
|---|---|---|---|
| CN | 101583169 A | 11/2009 | |
| CN | 101873566 A | 10/2010 | |

(Continued)

*Primary Examiner* — Charles Shedrick

(57) ABSTRACT

Embodiments of the present invention provide a method for controlling UE to access a communications network of a high-speed moving vehicle, a core network control plane node device, a base station, UE, and a communications system. The method includes: determining that UE accessing the communications network is first-type UE, allocating a temporary identifier that includes a first sequence to the UE, and sending the temporary identifier to the UE, where when the UE accesses a public network, the first sequence is used to instruct the base station to transfer the UE to the communications network. In the embodiments of the present invention, user experience of the UE is improved.

20 Claims, 4 Drawing Sheets

(56) References Cited

U.S. PATENT DOCUMENTS

2013/0171995 A1    7/2013  Fujishiro et al.

FOREIGN PATENT DOCUMENTS

| CN | 102300279 A | 12/2011 |
| CN | 102413520 A | 4/2012 |
| CN | 102647766 A | 8/2012 |
| CN | 102938917 A | 2/2013 |
| CN | 103167569 A | 6/2013 |
| CN | 103702329 A | 4/2014 |
| CN | 103813403 A | 5/2014 |
| WO | 2011011958 A1 | 2/2011 |
| WO | 2013097063 A1 | 7/2013 |

* cited by examiner

METHOD FOR CONTROLLING USER EQUIPMENT TO ACCESS COMMUNICATIONS NETWORK OF HIGH-SPEED MOVING VEHICLE

CROSS-REFERENCE TO RELATED APPLICATIONS

This application is a continuation of International Application No. PCT/CN2014/087811, filed on Sep. 29, 2014, the disclosure of which is hereby incorporated by reference in its entirety.

TECHNICAL FIELD

The present invention relates to the field of mobile communications technologies, and in particular, to a method for controlling user equipment to access a communications network of a high-speed moving vehicle, a core network control plane node device, user equipment, a base station, and a communications system.

BACKGROUND

High-speed moving vehicles develop rapidly in China and all over the world. For example, the high-speed moving vehicles include a high-speed railway train, a magnetic levitation train, and a metro. The high-speed railway train is used as an example. Operating mileage of the high-speed railway train is over 30000 kilometers and is increasing rapidly. Many high-end persons frequently take the high-speed moving vehicles for a long time, and the high-speed moving vehicles require information-based construction. Therefore, there is an ever-increasing communication requirement of the high-speed moving vehicles.

However, the high-speed moving vehicles are different from conventional indoor and outdoor mobile communications scenarios. Because a train is moving at a high speed, a train body has a large penetration loss, scenes and terrains are complicated and varied, and the like, a current public network is not suitable for providing services for users taking the high-speed moving vehicles. Therefore, it is increasingly urgent to establish a dedicated network that provides a service for users taking high-speed moving vehicles. For example, currently there are equipment vendors and operators that have begun to plan and deploy such a high-speed railway dedicated wireless network (referred to as a "high-speed railway dedicated network" in the following). The high-speed railway dedicated network covers an ongoing journey of a high-speed railway train and areas near a platform of the high-speed railway station. Cell deployment in a high-speed railway station area is shown in FIG. 1A. Dedicated network cells of the high-speed railway station within coverage of a high-speed railway dedicated network 106 include an indoor distributed cell and a platform cell. Both a waiting room 102 and an entrance and exit passageway 103 belong to the indoor distributed cell 101. A platform 104 belongs to the platform cell. A public network cell 105 covers a railway station square outside the railway station. Currently, the dedicated network cell and the public network cell are individually deployed during high-speed railway network planning. In consideration of line-type coverage of a railway, a solution of cell cascading and continuous coverage is used for the high-speed railway dedicated network, as shown in FIG. 1B. In the example of FIG. 1B, a high-speed railway track area is continuously covered by cascaded dedicated network cells 111, and public network cells 115 also cover the high-speed railway track area.

The public network and the high-speed railway dedicated network use the following cooperation principles:

(1) In most areas of a high-speed railway (for example, on an ongoing journey of a high-speed railway train), a neighboring cell relationship is not mutually configured between a high-speed railway dedicated network cell and a surrounding public network cell. That is, only a cascaded cell in the dedicated network is configured as a neighboring cell of the dedicated network cell, and no public network cell is configured as a neighboring cell of the dedicated network cell; and no dedicated network cell is configured as a neighboring cell of the public network cell.

(2) A mutual neighboring cell relationship is configured, between a public network cell and a dedicated network cell, near the platform of the railway station, so that first-type UE accesses a dedicated network cell (such as the dedicated network cell 101 in FIG. 1A) from a public network cell (such as the public network cell 105 in FIG. 1A), or accesses a public network cell from a dedicated network cell.

On an ongoing journey of a high-speed railway train, because there is no mutual neighboring cell relationship between a high-speed railway dedicated network cell and a surrounding public network cell, user equipment (UE for short) in an idle state cannot access another type of network cell (such as the dedicated network cell 111 in FIG. 1B) from one type of network cell (such as the public network cell 115 in FIG. 1B) by performing cell reselection, and the UE in a connected state cannot be handed over to another type of network cell by performing a handover procedure. Therefore, on an ongoing journey of a high-speed moving vehicle, when UE is detached from a communications network of the high-speed moving vehicle due to an exception and accesses a public network, the UE cannot subsequently return to the communications network of the high-speed moving vehicle in the prior art, and this affects user experience of a user taking the high-speed moving vehicle.

SUMMARY

According to a first aspect, the present invention provides a method for controlling user equipment UE to access a communications network of a high-speed moving vehicle, including:

determining, by a core network control plane node device, that first UE accessing the communications network of the high-speed moving vehicle is first-type UE, where the first-type UE is UE used by a user taking the high-speed moving vehicle;

allocating, by the core network control plane node device, a first temporary identifier to the first UE, where the first temporary identifier includes a first sequence, and the first sequence is used to indicate that the first UE is first-type UE; and sending, by the core network control plane node device, the first temporary identifier to the first UE, where when the first UE accesses a public network, the first sequence is used to instruct a base station to transfer the first UE to the communications network of the high-speed moving vehicle.

In a first possible implementation manner of the first aspect, the determining, by a core network control plane node device, that first UE accessing the communications network of the high-speed moving vehicle is first-type UE includes:

when the UE accesses the communications network of the high-speed moving vehicle from a mobility management area of the communications network of the high-speed moving vehicle, determining, by the core network control plane node device, that the first UE is first-type UE; or when the UE accesses the communications network of the high-speed moving vehicle from a base station of the communications network of the high-speed moving vehicle, determining, by the core network control plane node device, that the first UE is first-type UE; or when the UE accesses the communications network of the high-speed moving vehicle from a cell of the communications network of the high-speed moving vehicle, determining, by the core network control plane node device, that the first UE is first-type UE.

In a second possible implementation manner of the first aspect, if the first UE accesses the communications network of the high-speed moving vehicle from a first area of the high-speed moving vehicle, the determining, by a core network control plane node device, that the first UE is first-type UE includes:

when the first UE accesses the communications network of the high-speed moving vehicle from a mobility management area of the first area of the communications network of the high-speed moving vehicle, determining, by the core network control plane node device, that the first UE is first-type UE; or when the first UE accesses the communications network of the high-speed moving vehicle from a base station of the first area of the communications network of the high-speed moving vehicle, determining, by the core network control plane node device, that the first UE is first-type UE; or when the first UE accesses the communications network of the high-speed moving vehicle from a cell of the first area of the communications network of the high-speed moving vehicle, determining, by the core network control plane node device, that the first UE is first-type UE.

The first area includes a station area of the high-speed moving vehicle.

In a third possible implementation manner of the first aspect, if the first UE accesses the communications network of the high-speed moving vehicle from a second area of the high-speed moving vehicle, the determining, by a core network control plane node device, that the first UE is first-type UE includes:

when the first UE moves from a first mobility management area of the second area of the communications network to a second mobility management area of a track area of the communications network, and the first UE accesses the communications network from the second mobility management area, determining, by the core network control plane node device, that the first UE is first-type UE; or when the first UE moves from a first base station of the second area of the communications network to a second base station of a track area of the communications network, and the first UE accesses the communications network from the second base station, determining, by the core network control plane node device, that the first UE is first-type UE; or when the first UE moves from a first cell of the second area of the communications network to a second cell of a track area of the communications network, and the first UE accesses the communications network from the second cell, determining, by the core network control plane node device, that the first UE is first-type UE; or receiving, by the core network control plane node device, a notification message sent by the base station, where the notification message is used to indicate that the first UE is first-type UE, and determining, by the core network control plane node device, that the first UE is first-type UE according to the notification message.

The second area includes the track area of the high-speed moving vehicle.

With reference to the first to the third possible implementation manners, in a fourth possible implementation manner, the mobility management area includes a tracking area TA, a routing area RA, or a location area LA.

With reference to the first aspect and the foregoing possible implementation manners, in a fifth possible implementation manner, the sending, by the core network control plane node device, the first temporary identifier to the first UE includes:

sending, by the core network control plane node device, a first temporary identifier reallocation message to the first UE, where the first temporary identifier reallocation message carries the first temporary identifier; or sending, by the core network control plane node device, an attach accept message to the first UE, where the attach accept message carries the first temporary identifier; or sending, by the core network control plane node device, a mobility management area update accept message to the first UE, where the mobility management area update accept message carries the first temporary identifier.

With reference to the fifth possible implementation manner, in a sixth possible implementation manner, the mobility management area update accept message includes any one of the following: a tracking area update accept message, a routing area update accept message, or a location area update accept message.

With reference to the first aspect and the foregoing possible implementation manners, in a seventh possible implementation manner, the method further includes:

determining that the first UE is in the communications network of the high-speed moving vehicle; and if the core network control plane node device that serves the first UE changes to a second core network control plane node device, allocating, by the second core network control plane node device, a second temporary identifier to the first UE, where the second temporary identifier includes a second sequence, and the second sequence is used to indicate that the first UE is first-type UE.

With reference to the first aspect and the foregoing possible implementation manners, in an eighth possible implementation manner, the method further includes:

determining that second UE accessing the public network is not first-type UE; and allocating, by the core network control plane node device, a third temporary identifier to the second UE, where the third temporary identifier includes a third sequence, and the third sequence is used to indicate that the second UE is not first-type UE.

With reference to the first aspect and the foregoing possible implementation manners, in a ninth possible implementation manner, the first temporary identifier includes a globally unique temporary identity GUTI, a temporary mobile subscriber identity TMSI, or a packet temporary mobile subscriber identity P-TMSI.

With reference to the first aspect and the foregoing possible implementation manners, in a tenth possible implementation manner, the first sequence includes a mobility management entity code MMEC or a network resource identifier NRI.

According to a second aspect, the present invention further provides a method for controlling user equipment UE to access a communications network of a high-speed moving vehicle, including:

after the UE accesses the communications network of the high-speed moving vehicle, receiving, by the UE, a first temporary identifier sent by a core network control plane node device, where the first temporary identifier includes a first sequence, the first sequence is used to indicate that the UE is first-type UE, and the first-type UE is UE used by a user taking the high-speed moving vehicle;

after the first-type UE accesses a public network, sending, by the first-type UE, a radio resource control RRC setup request message to a base station, where the RRC setup request message carries the first sequence; and receiving an RRC connection release message sent by the base station, where the RRC connection release message is generated by the base station according to the first sequence, and the RRC connection release message is used to instruct the first-type UE to access the communications network of the high-speed moving vehicle.

According to a third aspect, the present invention further provides a method for controlling UE to access a communications network of a high-speed moving vehicle, including:

receiving, by a base station, a radio resource control RRC setup request message sent by the UE;

determining whether the RRC setup request message carries a first sequence, where the first sequence is allocated to first-type UE after a core network control plane node device determines that the UE is first-type UE, and the first-type UE is UE used by a user taking the high-speed moving vehicle;

generating an RRC connection release message according to the first sequence; and sending the RRC connection release message to the first-type UE, where the RRC connection release message is used to instruct the first-type UE to access the communications network of the high-speed moving vehicle.

According to a fourth aspect, the present invention further provides a core network control plane node device, including:

a processor, configured to determine that first UE accessing a communications network of a high-speed moving vehicle is first-type UE, where the first-type UE is UE used by a user taking the high-speed moving vehicle; and further configured to allocate a first temporary identifier to the first UE, where the first temporary identifier includes a first sequence, and the first sequence is used to indicate that the first UE is first-type UE; and a transceiver, configured to send the first temporary identifier to the first UE, where when the first UE accesses a public network, the first sequence is used to instruct a base station to transfer the first UE to the communications network of the high-speed moving vehicle.

In a first possible implementation manner of the fourth aspect, when the UE accesses the communications network of the high-speed moving vehicle from a mobility management area of the communications network of the high-speed moving vehicle, the processor is configured to determine that the first UE is first-type UE; or when the UE accesses the communications network of the high-speed moving vehicle from a base station of the communications network of the high-speed moving vehicle, the processor is configured to determine that the first UE is first-type UE; or when the UE accesses the communications network of the high-speed moving vehicle from a cell of the communications network of the high-speed moving vehicle, the processor is configured to determine that the first UE is first-type UE.

In a second possible implementation manner of the fourth aspect, when the first UE accesses the communications network of the high-speed moving vehicle from a mobility management area of a first area of the communications network of the high-speed moving vehicle, the processor is configured to determine that the first UE is first-type UE; or when the first UE accesses the communications network of the high-speed moving vehicle from a base station of a first area of the communications network of the high-speed moving vehicle, the processor is configured to determine that the first UE is first-type UE; or when the first UE accesses the communications network of the high-speed moving vehicle from a cell of a first area of the communications network of the high-speed moving vehicle, the processor is configured to determine that the first UE is first-type UE.

The first area includes a station area of the high-speed moving vehicle.

In a third possible implementation manner of the fourth aspect, when the first UE moves from a first mobility management area of a second area of the communications network to a second mobility management area of a track area of the communications network, and the first UE accesses the communications network from the second mobility management area, the processor is configured to determine that the first UE is first-type UE; or when the first UE moves from a first base station of a second area of the communications network to a second base station of a track area of the communications network, and the first UE accesses the communications network from the second base station, the processor is configured to determine that the first UE is first-type UE; or when the first UE moves from a first cell of a second area of the communications network to a second cell of a track area of the communications network, and the first UE accesses the communications network from the second cell, the processor is configured to determine that the first UE is first-type UE; or the transceiver receives a notification message sent by the base station, where the notification message is used to indicate that the first UE is first-type UE, and the processor is configured to determine that the first UE is first-type UE according to the notification message.

The second area includes the track area of the high-speed moving vehicle.

With reference to the first to the third possible implementation manners, in a fourth possible implementation manner, the mobility management area includes a tracking area TA, a routing area RA, or a location area LA.

With reference to the fourth aspect and the foregoing possible implementation manners, in a fifth possible implementation manner, the transceiver is configured to send a first temporary identifier reallocation message to the first UE, where the first temporary identifier reallocation message carries the first temporary identifier; or the transceiver is configured to send an attach accept message to the first UE, where the attach accept message carries the first temporary identifier; or the transceiver is configured to send a mobility management area update accept message to the first UE, where the mobility management area update accept message carries the first temporary identifier.

With reference to the fifth possible implementation manner, in a sixth possible implementation manner, the mobility management area update accept message includes any one of the following: a tracking area update accept message, a routing area update accept message, or a location area update accept message.

With reference to the fourth aspect and the foregoing possible implementation manners, in a seventh possible implementation manner, the processor is further configured to:

determine that second UE accessing the public network is not first-type UE; and the core network control plane node device allocates a third temporary identifier to the second UE, where the third temporary identifier includes a third sequence, and the third sequence is used to indicate that the second UE is not first-type UE.

With reference to the fourth aspect and the foregoing possible implementation manners, in an eighth possible implementation manner, the first temporary identifier includes a globally unique temporary identity GUTI, a temporary mobile subscriber identity TMSI, or a packet temporary mobile subscriber identity P-TMSI.

With reference to the fourth aspect and the foregoing possible implementation manners, in a ninth possible implementation manner, the first sequence includes a mobility management entity code MMEC or a network resource identifier NRI.

According to a fifth aspect, the present invention further provides user equipment, including:

a transceiver, where after the UE accesses a communications network of a high-speed moving vehicle, the transceiver is configured to receive a first temporary identifier sent by a core network control plane node device, where the first temporary identifier includes a first sequence, the first sequence is used to indicate that the UE is first-type UE, and the first-type UE is UE used by a user taking the high-speed moving vehicle; and a processor, where after the first-type UE accesses a public network, the processor is configured to generate the radio resource control RRC setup request message that carries the first sequence; where the transceiver is configured to send the RRC setup request message to a base station; and is further configured to receive an RRC connection release message sent by the base station, where the RRC connection release message is generated by the base station according to the first sequence, and the RRC connection release message is used to instruct the first-type UE to access the communications network of the high-speed moving vehicle.

According to a sixth aspect, the present invention further provides a base station, including:

a transceiver, configured to receive a radio resource control RRC setup request message sent by user equipment UE; and a processor, configured to determine whether the RRC setup request message carries a first sequence, where the first sequence is allocated to the UE after a core network control plane node device determines that the UE is first-type UE, and the first-type UE is UE used by a user taking the high-speed moving vehicle; and further configured to generate an RRC connection release message according to the first sequence; where the transceiver is further configured to send the RRC connection release message to the first-type UE, where the RRC connection release message is used to instruct the first-type UE to access a communications network of the high-speed moving vehicle.

According to the method for controlling user equipment to access a communications network of a high-speed moving vehicle, the core network control plane node device, the user equipment, and the base station provided in the embodiments of the present invention, after determining that UE accessing the communications network of the high-speed moving vehicle is first-type UE, the core network control plane node device allocates a first temporary identifier that includes a first sequence to the UE, and sends the first temporary identifier to a base station of the communications network of the high-speed moving vehicle. Therefore, on an ongoing journey of the high-speed moving vehicle, even if the UE is detached from the communications network of the high-speed moving vehicle due to an exception and accesses a public network, after the UE sends a radio resource control RRC setup request message that carries the first sequence to the base station, the base station generates an RRC connection release message according to the first sequence, and sends the RRC connection release message to the UE, where the RRC connection release message is used to instruct the first-type UE to access the communications network of the high-speed moving vehicle. Therefore, the UE can access the communications network of the high-speed moving vehicle again, thereby improving user experience of a user taking the high-speed moving vehicle.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

Figure 1A:
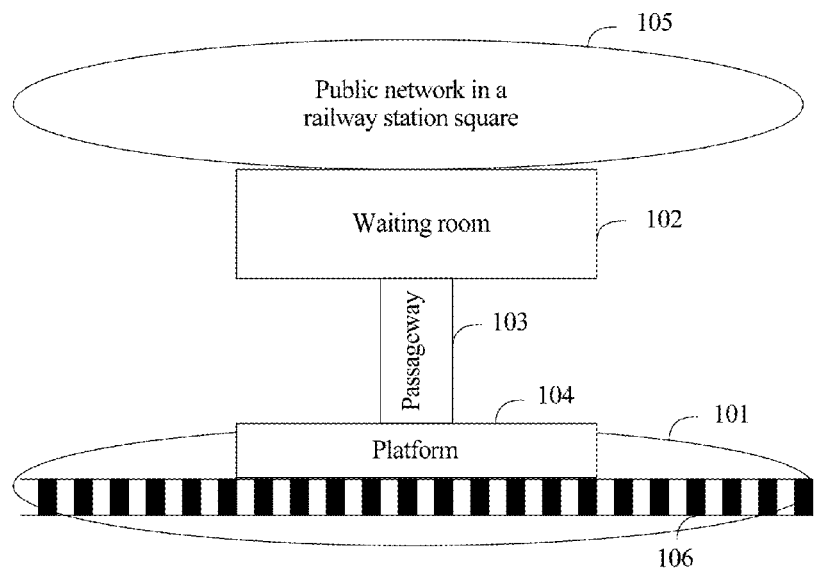
FIG. 1A is a schematic diagram of cell deployment of a high-speed railway dedicated network and a public network in a high-speed railway station area.
Figure 1B:
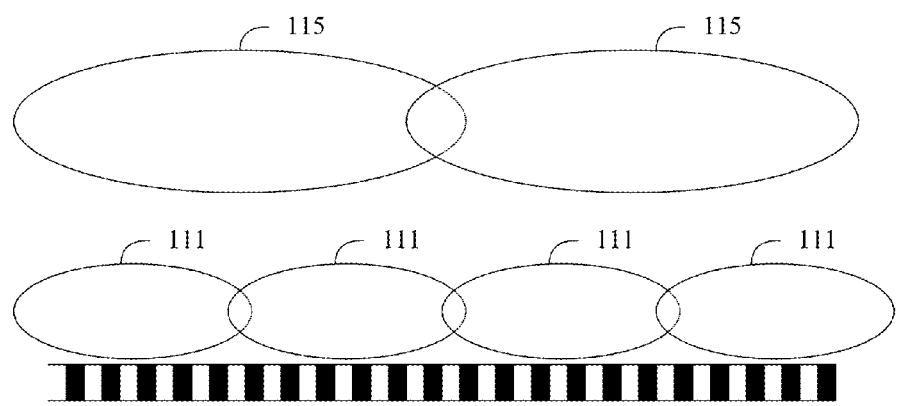
FIG. 1B is a schematic diagram of cell deployment of a high-speed railway dedicated network and a public network along a track area of a high-speed railway train.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The present invention is used to control UE to access a communications network of a high-speed moving vehicle, so that UE that belongs to a user taking the high-speed moving vehicle can still return to the communications network of the high-speed moving vehicle even if the UE is detached from the communications network of the high-speed moving vehicle due to an exception and accesses a public network on an ongoing journey. In the following description, the UE used by the user taking the high-speed moving vehicle (for example, a high-speed railway train) is referred to as first-type UE, and UE used by a user who does not take the high-speed moving vehicle is referred to as non-first-type UE.

A communications network of a high-speed moving vehicle applicable to the present invention refers to a dedicated network that provides a communications service for a user taking the high-speed moving vehicle. The communications network includes but is not limited to a Long Term Evolution (LTE for short) network, a Global system for mobile communications (GSM for short) network, or a Universal Mobile Telecommunications System (UMTS for short) network. In a scenario of any one of the foregoing networks, a communications system includes at least a core network control plane node device, UE, and a base station. In the LTE network, the core network control plane node device includes but is not limited to a mobility management entity (MME for short), and the base station includes but is not limited to an E-UTRAN NodeB (eNodeB for short). In the GSM network or the UMTS network, the core network control plane node device includes but is not limited to a serving general packet radio service (GPRS for short) support node (SGSN for short), or a mobile switching center (MSC for short), and the base station includes but is not limited to a base station controller (BSC for short), or a radio network controller (RNC for short). In the present invention, different access network devices (for example, eNodeBs) are separately deployed in a public network and the communications network of the high-speed moving vehicle.

The following provides description by using an example that the high-speed moving vehicle is a high-speed railway train, and the communications network of the high-speed moving vehicle is a high-speed railway LTE network. However, the present invention is not limited thereto. The high-speed moving vehicle includes but is not limited to the high-speed railway train, a magnetic levitation train, or a metro. Moreover, the present invention is also applicable to the GSM network or the UMTS network.

For example, coverage scenarios of a high-speed railway dedicated network may be classified into two cases: a high-speed railway station and an ongoing journey of the high-speed railway train. The high-speed railway station is covered by a platform cell and an indoor distributed cell, and the ongoing journey of the high-speed railway train is covered by cascaded dedicated network cells. In addition, both the high-speed railway station and the ongoing journey are further at least partly covered by a public network cell near the high-speed railway dedicated network.

Figure 2:
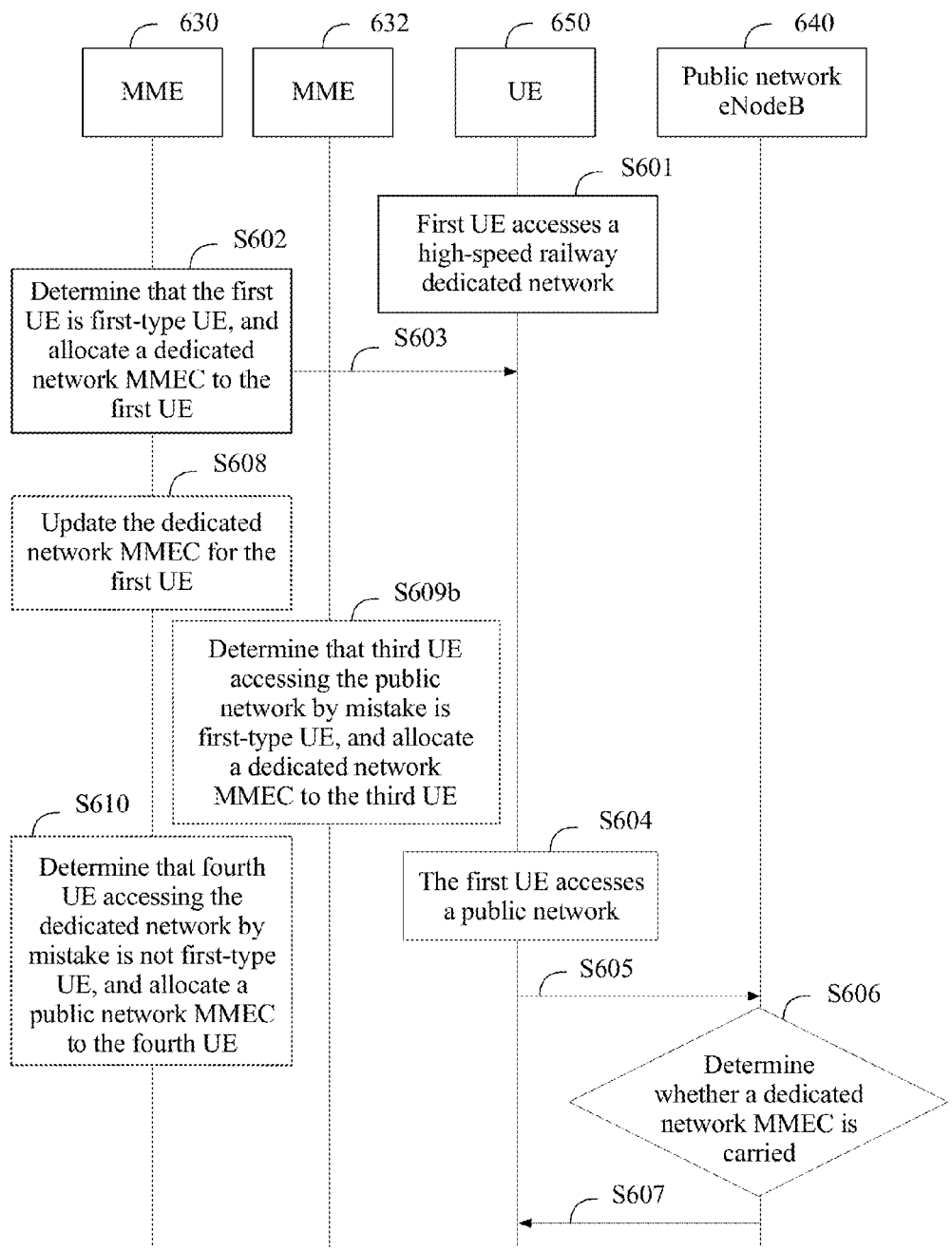
FIG. 2 is a schematic diagram of a method for controlling UE to access a communications network of a high-speed moving vehicle according to an embodiment of the present invention.

FIG. 2 is a flowchart of a method for controlling UE to access a communications network of a high-speed moving vehicle according to an embodiment of the present invention. The method is executed cooperatively by an MME 630, UE 650, and an eNodeB 640 in a communications system 600. In an example in FIG. 2, the eNodeB 640 is an eNodeB of a public network close to the communications network of the high-speed moving vehicle (for example, a high-speed railway dedicated network). The MME 630 is a dedicated MME of the communications network of the high-speed moving vehicle (for example, the high-speed railway dedicated network), or an MME shared by the communications network of the high-speed moving vehicle and the public network. As shown in FIG. 2, the method includes the following steps.

S601. The first UE 650 accesses the communications network of the high-speed moving vehicle. For example, the first UE 650 accesses the high-speed railway dedicated network.

For example, when UE enters a railway station and waits for a train, because signals in an indoor distributed cell and a platform cell in a railway station area are relatively strong, most UE may leave a public network cell and access the platform cell or the indoor distributed cell, so as to access the high-speed railway dedicated network in which a dedicated network eNodeB and a dedicated network MME provide a service for users. For another example, a user switches off UE when entering a railway station, and in a track area, the UE is switched on and accesses the high-speed railway dedicated network, in an attach procedure, in which a dedicated network eNodeB and a dedicated network MME provide a service for the user.

S602. The MME 630 determines that the UE 650 is first-type UE.

Specifically, the MME 630 may determine that the UE 650 is first-type UE in the following manners:

(1) The MME 630 determines that the UE 650 is first-type UE by using a cell granularity.

When the UE 650 accesses the communications network of the high-speed moving vehicle from a cell of the communications network of the high-speed moving vehicle, the core network control plane node device determines that the UE 650 is first-type UE.

Information about a dedicated network cell corresponding to the high-speed railway dedicated network is configured on the MME 630. The information about the dedicated network cell includes but is not limited to a cell identity of the dedicated network cell. When the UE 650 enters a connected state, the UE 650 sends NAS signaling to the MME 630. The MME 630 may identify, according to cell information of the UE 650 reported by a base station, whether the UE 650 is located in the dedicated network cell. When the MME 630 identifies that the UE 650 is located in the dedicated network cell, the MME 630 determines that the UE 650 is first-type UE.

(2) The MME 630 determines that the UE 650 is first-type UE by using an eNodeB granularity.

When the UE 650 accesses the communications network of the high-speed moving vehicle from a base station of the communications network of the high-speed moving vehicle, the core network control plane node device determines that the UE 650 is first-type UE.

Information about a dedicated network eNodeB corresponding to the high-speed railway dedicated network is configured on the MME 630. The information about the dedicated network eNodeB includes but is not limited to an identity or an IP address of the dedicated network eNodeB. All signaling of the UE 650 is sent to the MME 630 by using an eNodeB. Therefore, the MME 630 may identify whether an eNodeB that serves the UE 650 is a dedicated network eNodeB according to eNodeB information. When the MME 630 identifies that the base station that serves the UE 650 is a dedicated network eNodeB, the MME 630 determines that the UE 650 is first-type UE.

(3) The MME 630 determines that the UE 650 is first-type UE by using a TA granularity.

When the UE 650 accesses the communications network of the high-speed moving vehicle from a TA of the communications network of the high-speed moving vehicle, the core network control plane node device determines that the UE 650 is first-type UE.

In this case, a dedicated network MME and a public network MME may be separately deployed, or a high-speed railway TA and a non-high-speed railway TA may be separately planned in one MME device. If all high-speed railway areas belong to one TA, whether the UE is first-type UE may be determined in the foregoing manner (1) or manner (2). Information about a dedicated network TAI corresponding to the high-speed railway dedicated network is configured on the MME 630. For example, a dedicated network TAI and a public network TAI may be distinguished by using TACs in the TAIs.

For example, after the UE 650 accesses the indoor distributed cell or the platform cell of the railway station, due to a TA change, the UE 650 initiates and executes a TAU procedure, an attach procedure, a service request procedure, or a handover procedure to the MME 630 by using an eNodeB. The UE 650 or the eNodeB reports a currently located TAI or a target TAI of the UE 650 to the MME 630 by using the TAU procedure, the attach procedure, the service request procedure, or the handover procedure. The MME 630 may identify whether the currently located TAI or the target TAI is a dedicated network TAI according to the currently located TAI or the target TAI reported by the UE 650 or the eNodeB. When the MME 630 identifies that the currently located TAI or the target TAI reported by the UE 650 or the eNodeB is a dedicated network TAI, the MME 630 determines that the UE 650 is first-type UE.

Therefore, the MME 630 allocates a temporary identifier to the UE. The temporary identifier carries a sequence used to indicate that the UE is first-type UE.

For example, the MME 630 allocates a first temporary identifier to the UE 650 that accesses the high-speed railway dedicated network. The first temporary identifier carries a first sequence, and the first sequence is used to indicate that the UE 650 is first-type UE. In an MME sharing scenario, the MME 630 further allocates a second temporary identifier (not shown in the figure) to second UE accessing a public network. The second temporary identifier carriers a second sequence, and the second sequence is used to indicate that the UE is non-first-type UE. For example, the second UE includes UE accessing a public network cell overlapping the indoor distributed cell instead of accessing the platform cell or the indoor distributed cell in the railway station, or UE accessing another public network cell near the platform.

In an LTE network, the temporary identifier includes but is not limited to a globally unique temporary identity (GUTI for short). A sequence included in the temporary identifier includes but is not limited to a mobility management entity code (MMEC for short). Therefore, the first temporary identifier GUTI allocated by the MME 630 to the first UE carries the first sequence, and the first sequence is a dedicated network MMEC. The second temporary identifier GUTI allocated by the MME 630 to the second UE carries the second sequence, and the second sequence is a public network MMEC. The MME 630 may distinguish whether UE is first-type UE according to different MMECs.

When the present invention is applied to a 2G network or a 3G network, the temporary identifier includes but is not limited to a temporary mobile subscriber identity (TMSI for short) in a CS domain, or a packet temporary mobile subscriber identity (P-TMSI for short) in a PS domain. A sequence included in the temporary identifier includes but is not limited to a network resource identifier (NRI for short). A core network control plane node device SGSN or MSC may distinguish whether UE is first-type UE according to different NRIs.

For example, an MMEC is an 8-bit sequence. Whether the MMEC is a dedicated network MMEC or a public network MMEC may be distinguished by performing setting for one or more bits in the MMEC, so as to distinguish whether UE that has the MMEC is first-type UE. For example, if a most significant bit of an MMEC is set to 1, the MMEC is a dedicated network MMEC, and is corresponding to first-type UE. If a most significant bit of an MMEC is set to 0, the MMEC is a public network MMEC, and is corresponding to non-first-type UE.

S603. The MME 630 sends a first GUTI to the first UE 650. The first GUTI carries a dedicated network MMEC. Correspondingly, the first UE 650 receives the first GUTI sent by the MME 630. The first GUTI carries the dedicated network MMEC used to indicate that the first UE is first-type UE. In the LTE network, the MME 630 sends the first GUTI to the first UE. Specifically, the MME 630 sends a GUTI reallocation message to the first UE, where the GUTI reallocation message carries the first GUTI; or the MME 630 sends an attach accept message to the first UE, where the attach accept message carries the first GUTI; or the MME 630 sends a tracking area update accept message to the first UE, where the tracking area update accept message carries the first GUTI.

When the present invention is applied to the 2G network or the 3G network, an MSC/SGSN sends a first TMSI/P-TMSI to the first UE. Specifically, the MSC/SGSN may send a TMSI/P-TMSI reallocation message to the first UE, where the TMSI/P-TMSI reallocation message carries the first TMSI/P-TMSI; or the MSC/SGSN sends an attach accept message to the first UE, where the attach accept message carries the first TMSI/P-TMSI; or the MSC/SGSN sends a location area/routing area update accept message to the first UE, where the location area/routing area update accept message carries the first TMSI/P-TMSI.

Therefore, in a subsequent running process of a high-speed railway train, both the MME 630 and the eNodeB 640 may determine that the UE is first-type UE according to the first sequence (dedicated network MMEC). If the first UE 650 accesses a public network by mistake due to an exception, the eNodeB 640 may instruct, according to the dedicated network MMEC, the UE to redirect to a cell of the high-speed railway dedicated network. That is, the dedicated network MMEC is used by the eNodeB of the public network accessed by the UE by mistake to determine that the UE is first-type UE, so as to instruct the UE to redirect to the cell of the high-speed railway dedicated network.

S604. The first UE 650 that actually belongs to a high-speed railway dedicated network accesses a public network by mistake on an ongoing journey. The first UE has received the dedicated network MMEC that is allocated by the MME 630 and that is used to indicate that the first UE is first-type UE.

S605. The first UE 650 sends a radio resource control (RRC for short) setup request message to the eNodeB 640. The RRC setup request message carries the dedicated network MMEC.

S606. The eNodeB 640 determines whether the RRC setup request message carries a dedicated network MMEC.

For example, the eNodeB 640 determines whether a most significant bit of a sequence MMEC in the RRC setup request message is set to 1. If the most significant bit of the sequence MMEC in the RRC setup request message is set to 1, the eNodeB 640 determines that the RRC setup request message carries the dedicated network MMEC. If the most significant bit of the sequence MMEC is not set to 1, the eNodeB 640 determines that the RRC setup request message does not carry the dedicated network MMEC.

S607. If the eNodeB 640 determines that the RRC setup request message carries the dedicated network MMEC, the eNodeB 640 sends an RRC connection release (RRC Connection Release) message to the UE, where redirected Carrier Info in the RRC Connection Release message is used to instruct the UE 650 to redirect to the high-speed railway dedicated network. Therefore, the UE accesses the high-speed railway dedicated network by means of redirection.

Therefore, in the present invention, a core network control plane node device MME distinguishes first-type UE from non-first-type UE by allocating different temporary identifiers to the first-type UE and the non-first-type UE, so as to ensure that the first-type UE can access a high-speed railway dedicated network, always camp on the dedicated network, and can quickly return to the dedicated network even if the first-type UE accesses a public network by mistake due to an exception. Therefore, a dedicated network resource is provided for the first-type UE, thereby improving service experience of the first-type UE.

Optionally, after the core network control plane node device allocates and delivers the temporary identifier to the UE, the method may further include at least one of the following steps S608, S609, or S610. Steps S608 and S610 are performed by a dedicated core network control plane node device (for example, the MME 630) of the high-speed railway dedicated network or a shared MME. Step S609 is performed by a dedicated core network control plane node device (for example, an MME 632) of the public network or a shared MME.

S608. The MME 630 updates the dedicated network MMEC for the first UE.

For example, in the LTE network, for the first UE to which the dedicated network MMEC has been allocated, a mobility management procedure such as a TAU procedure or a handover procedure is caused because the high-speed railway train moves at a high speed.

An environment of the LTE network is used as an example. In a moving process of the high-speed railway train, the UE sends a TAU request message or a handover request message to the MME 630 by using a dedicated network eNodeB. If the MME 630 identifies that the UE is located in a dedicated network cell, the MME 630 accepts a TAU request or a handover request of the UE, and sends a response message. For example, the MME may identify, by determining whether the UE carries the first sequence (for example, the dedicated network MMEC), or whether the TAU request message or the handover request message comes from the dedicated network eNodeB, whether the UE is located in the dedicated network cell.

When identifying that the UE is located in the dedicated network cell, the MME 630 further determines whether the MME changes. For example, a core network device MME has a relatively wide coverage area. When the high-speed railway train runs for a relatively short distance, for example, from Jiangsu province to Shanghai, the high-speed railway train is always covered by one MME in a running process. If the train runs from Jiangsu province to Shandong province, the MME changes on the ongoing journey. After the MME that covers the UE changes, a new MME allocates a new temporary identifier GUTI to the UE, where the GUTI includes a new dedicated network MMEC. For example, the MMEC is an 8-bit sequence. A sequence MMEC whose most significant bit is set to 1 is a dedicated network MMEC, and is corresponding to first-type UE. For example, within coverage of a first MME, a dedicated network MMEC allocated by the first MME to the UE is 10000000. When the UE is covered by a second MME, a dedicated network MMEC allocated by the second MME to the UE is 10000001.

If first-type UE (for example, third UE) to which no dedicated network MMEC is allocated accesses the public network due to an exception, step S609 may be performed, so that the first-type UE accesses the high-speed railway dedicated network. Specifically, the third UE includes UE that actually needs to access the high-speed railway dedicated network, but does not access the dedicated network due to an exception (for example, the dedicated network is congested on the platform) on the railway station platform, accesses the public network by mistake, and is allocated a public network MMEC. Alternatively, the third UE further includes UE that is switched on upon entering the track area, preferably selects a previously-camped-on frequency for access in an attach procedure, accesses the public network by mistake, and is allocated a public network MMEC.

Optionally, S609 may be implemented by performing S609a or S609b.

S609a (not shown in the figure). The third UE accesses the high-speed railway dedicated network from an open cell. Setting of the open cell is the same as description in FIG. 3B, and details are not described herein. After the third UE accesses the high-speed railway dedicated network, the MME 630 determines that the third UE is first-type UE, and allocates a dedicated network MMEC to the third UE. A step in which the MME 630 determines that the third UE is first-type UE and allocates the dedicated network MMEC is the same as step S602, and details are not described herein.

S609b. The MME 632 determines that third UE is first-type UE, and allocates a dedicated network MMEC to the third UE. Then, the MME 632 sends a notification message to a public network eNodeB that serves UE. The notification message is used to instruct the public network eNodeB that serves the UE to migrate the third UE that includes the dedicated network MMEC to the dedicated network. Specifically, the UE may be migrated to the dedicated network in a redirection or handover manner.

For example, information about a public network eNodeB close to the high-speed railway dedicated network needs to be pre-configured on the MME 632. When the third UE is in a connected state, step S609b specifically includes:

The MME 632 determines whether an eNodeB that serves the third UE is a public network eNodeB close to the high-speed railway dedicated network, and whether a change frequency of the eNodeB that serves the third UE is greater than a preset value. If the MME 632 determines that the eNodeB that serves the third UE is a public network eNodeB close to the high-speed railway dedicated network, and the change frequency of the eNodeB that serves the third UE is greater than the preset value, the MME 632 reallocates a temporary identifier GUTI to the third UE, where the temporary identifier GUTI carries a dedicated network MMEC.

Alternatively, the MME 632 may further receive a notification message sent by the public network eNodeB, where the notification message is used to notify the public network MME that the third UE is first-type UE. For example, the public network eNodeB that serves the UE and that is close to the high-speed railway line may determine, according to a speed measurement algorithm (for example, a Doppler shift algorithm), that the third UE is moving at a high speed, and further determine that the third UE in the connected state is first-type UE. After determining that the third UE in the connected state is first-type UE, the public network eNodeB sends the notification message to the public network MME, so that the public network MME determines that the third UE is first-type UE.

When the third UE is in an idle state, step S609b specifically includes:

When the third UE initiates a TAU procedure, the MME 632 receives a TAU request message. The MME 632 determines, according to the pre-configured information about the public network eNodeB close to the high-speed railway dedicated network, whether the TAU request message comes from the public network eNodeB close to the dedicated network. If the MME 632 determines that the TAU request message comes from the public network eNodeB close to the dedicated network, the MME 632 subsequently pages the third UE once at intervals. If it is found that all paging response messages come from the public network eNodeB close to the dedicated network, and a change frequency of the eNodeB is greater than a preset value, a GUTI is reallocated to the UE, where the GUTI carries a dedicated network MMEC. Then, the MME 632 sends a notification message to the public network eNodeB that serves the UE. The notification message is used to instruct the public network eNodeB to migrate the UE that includes the dedicated network MMEC to the dedicated network. Specifically, a user may be migrated to the dedicated network in a redirection or handover manner. Therefore, UE that does not access the dedicated network at the beginning on the railway station platform or that accesses the public network in an attach procedure when being switched on in the train can access the dedicated network in a running process of the high-speed railway train by performing step S609. This ensures that all first-type UE can access the dedicated network, thereby improving user experience of the first-type UE.

S610. The MME 630 determines that fourth UE accessing the dedicated network by mistake is non-first-type UE, and therefore allocates a public network MMEC to the fourth UE.

The fourth UE includes UE that actually belongs to a public network user, but accesses the dedicated network by mistake, and is allocated a dedicated network MMEC. For example, UE near the high-speed railway line may access the dedicated network in an attach procedure when being switched on, or a public network user may access the dedicated network by means of network reselection due to an exception. UE of this type may be removed from the high-speed railway dedicated network by performing step S610, and becomes a public network user.

For example, when the fourth UE is in an idle state, step S610 specifically includes:

If the MME finds that the UE is always located in a same TA within a period of time, for example, a TAI reported by the UE remains unchanged, or a change range of a TA of the UE within a period of time is less than a preset value, the MME reallocates a GUTI to the UE, where the GUTI carries a public network MMEC. The preset value may be set in consideration of factors such as an average speed of the high-speed railway train. Then, the MME 630 sends a notification message to a dedicated network eNodeB. The notification message is used to instruct the dedicated network eNodeB to migrate the fourth UE to the public network, and a specific migration manner may be a handover or redirection manner.

When the fourth UE is in a connected state, step S610 specifically includes:

If the MME finds that an eNodeB that serves the UE does not change within a period of time, or a change frequency of an eNodeB that serves the UE is less than a preset value, or cell information reported by the fourth UE or an eNodeB that serves the fourth UE does not change, or a change frequency of reported cell information is less than a preset value, a GUTI is reallocated to the fourth UE, where the GUTI carries a public network MMEC. The preset value may be set in consideration of factors such as an average speed of the high-speed railway train. Then, the MME sends a notification message to a dedicated network eNodeB. The notification message is used to instruct the dedicated network eNodeB to migrate the fourth UE to the public network, and a specific migration manner may be a handover or redirection manner.

Therefore, non-first-type UE that accesses the high-speed railway dedicated network by mistake may be identified by performing step S610, and the non-first-type UE can be removed from the dedicated network, so as to prevent a large quantity of non-first-type UE from accessing the high-speed railway dedicated network and occupying dedicated network resources for a long time, and avoid dedicated network congestion.

When the high-speed railway train arrives at a destination platform, UE having a dedicated network MMEC leaves the railway station, that is, leaves the high-speed railway dedicated network, and accesses the public network, and a public network eNodeB and MME accept an access request from the user. A public network eNodeB near the platform performs no redirection operation, so as to prevent ping-pong between the public network and the dedicated network and even network detach when the UE leaves the station.

Figure 3:
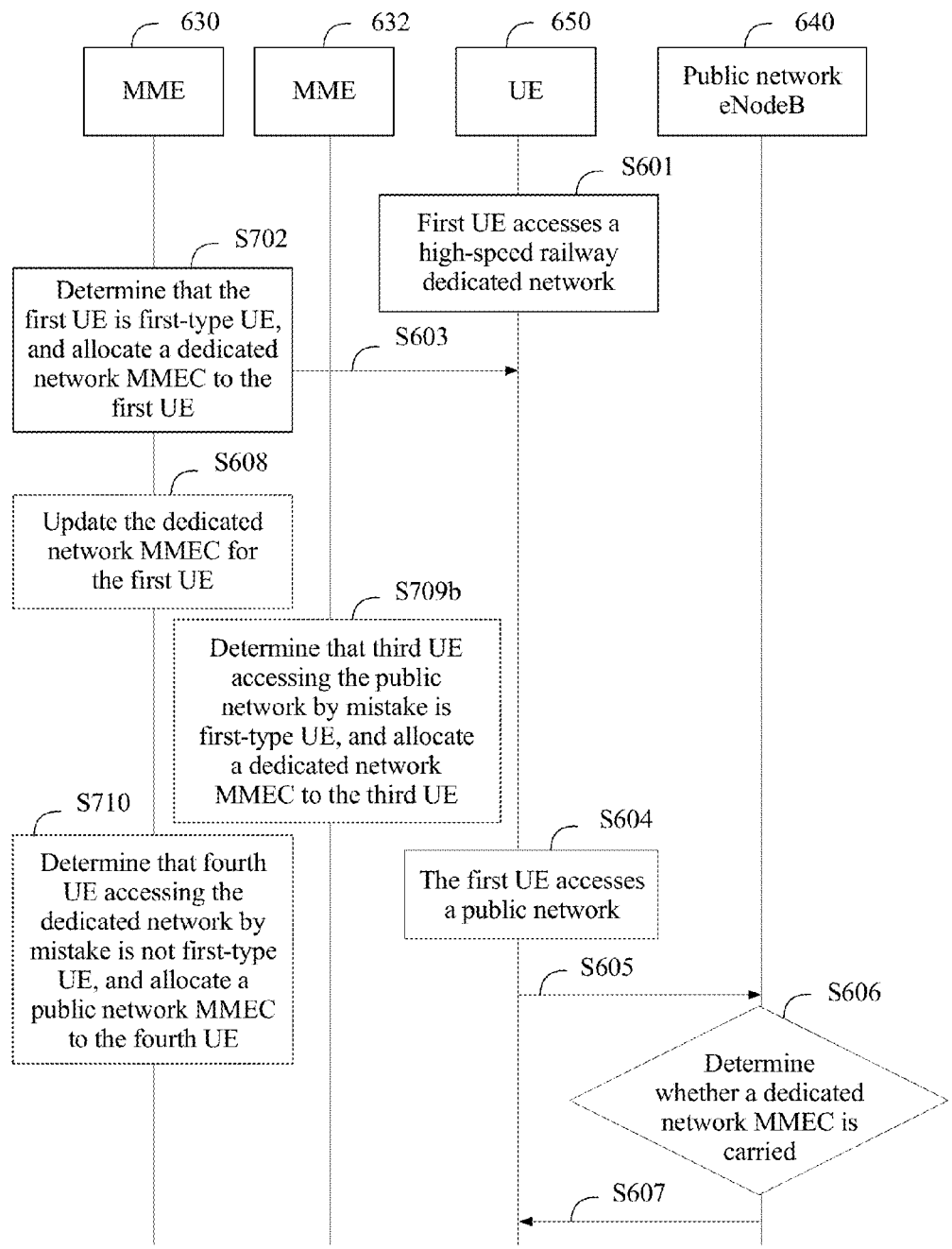
FIG. 3 is a schematic diagram of a method for controlling UE to access a communications network of a high-speed moving vehicle according to another embodiment of the present invention.

FIG. 3 is a flowchart of a method for controlling UE to access a communications network of a high-speed moving vehicle according to another embodiment of the present invention. FIG. 3 is described with reference to FIG. 2. Steps with same numbers in FIG. 2 and FIG. 3 are used to execute same or similar functions, and details are not described herein.

S702. After first UE 650 accesses the communications network of the high-speed moving vehicle, an MME 630 determines that the UE 650 is first-type UE, and therefore allocates a temporary identifier to the UE. The temporary identifier carries a sequence used to indicate that the UE is first-type UE. A specific step in which the MME 630 determines that the UE 650 is first-type UE in FIG. 3 is different from step S602 in FIG. 2.

Specifically, after the first UE accesses the communications network of the high-speed moving vehicle from a station area of the communications network of the high-speed moving vehicle, step S702 includes step S702a.

S702a. The MME 630 determines that the UE 650 is first-type UE.

Specifically, the MME 630 may determine that the UE 650 is first-type UE by using three different granularities: cell, eNodeB, and TA.

(1) The MME 630 determines that the UE 650 is first-type UE by using the cell granularity.

When the UE 650 accesses the communications network of the high-speed moving vehicle from a cell of the station area of the communications network of the high-speed moving vehicle, the core network control plane node device determines that the UE 650 is first-type UE.

For example, information about a dedicated network cell corresponding to a high-speed railway dedicated network in the railway station area is configured on the MME 630. The information about the dedicated network cell includes but is not limited to a cell identity of the dedicated network cell. When the UE 650 enters a connected state, the UE 650 sends NAS signaling to the MME 630. The MME 630 may identify, according to cell information of the UE 650 reported by a base station, whether the UE 650 is located in the dedicated network cell. When the MME 630 identifies that the UE 650 is located in the dedicated network cell, the MME 630 determines that the UE 650 is first-type UE.

(2) The MME 630 determines that the UE 650 is first-type UE by using the eNodeB granularity.

When the UE 650 accesses the communications network of the high-speed moving vehicle from a base station of the station area of the communications network of the high-speed moving vehicle, the core network control plane node device determines that the UE 650 is first-type UE.

For example, information about a dedicated network eNodeB corresponding to a high-speed railway dedicated network in the railway station area is configured on the MME 630. The information about the dedicated network eNodeB includes but is not limited to an identity or an IP address of the dedicated network eNodeB. All signaling of the UE 650 is sent to the MME 630 by using an eNodeB. Therefore, the MME 630 may identify whether an eNodeB that serves the UE 650 is a dedicated network eNodeB according to eNodeB information. When the MME 630 identifies that the base station that serves the UE 650 is a dedicated network eNodeB, the MME 630 determines that the UE 650 is first-type UE.

(3) The MME 630 determines that the UE 650 is first-type UE by using the TA granularity.

When the UE 650 accesses the communications network of the high-speed moving vehicle from a TA of the station area of the communications network of the high-speed moving vehicle, the core network control plane node device determines that the UE 650 is first-type UE.

In this case, a dedicated network MME and a public network MME may be separately deployed, or a high-speed railway TA and a non-high-speed railway TA may be separately planned in one MME device. If all high-speed railway areas belong to one TA, whether the UE is first-type UE may be determined in the foregoing manner (1) or manner (2). Information about a dedicated network tracking area identity (TAI for short) corresponding to a high-speed railway dedicated network in the railway station area is configured on the MME 630. For example, a dedicated network TAI and a public network TAI may be distinguished by using tracking area codes (TAC for short) in the TAIs.

After the UE 650 accesses an indoor distributed cell or a platform cell of the railway station, due to a TA change, the UE 650 initiates a tracking area update (TAU for short) procedure, an attach (attach) procedure, a service request (service request) procedure, a handover procedure, or the like to the MME 630 by using an eNodeB. The UE 650 or the eNodeB reports a currently located TAI or a target TAI of the UE 650 to the MME 630 by using the TAU procedure, the attach procedure, the service request procedure, or the handover procedure. The MME 630 may identify whether the currently located TAI or the target TAI is a dedicated network TAI according to the currently located TAI or the target TAI reported by the UE 650 or the eNodeB. When the MME 630 identifies that the currently located TAI or the target TAI reported by the UE 650 or the eNodeB is a dedicated network TAI, the MME 630 determines that the UE 650 is first-type UE.

For example, when entering the railway station from a railway station square, the switched-on UE 650 in an idle state initiates a TAU procedure to the MME 630 because a TA in which the UE is located changes. When the UE 650 initiates the TAU procedure to the MME 630, a currently located TAI of the UE reported by an eNodeB that serves the UE 650 to the MME 630 is a dedicated network TAI in the railway station area. Therefore, the MME 630 determines that the UE 650 is first-type UE. For another example, when the UE 650 that is performing a service enters the railway station from the railway station square, a service switching procedure may occur. In this case, the MME 630 receives a target TAI sent by an original network eNodeB and an original network MME. The MME 630 determines that the target TAI is a dedicated network TAI in the railway station area, and further determines that the UE 650 is first-type UE. Description of determining, by the MME 630 according to a TAI reported in another procedure, that the UE 650 is first-type UE is similar to the foregoing description, and details are not described herein.

After the first UE accesses the communications network of the high-speed moving vehicle from a track area of the communications network of the high-speed moving vehicle, step S702 includes step S702*b*.

S702*b*. The MME 630 determines that the UE 650 is first-type UE.

Specifically, the MME 630 may determine that the UE 650 is first-type UE by using three different granularities: cell, eNodeB, and TA.

(1) The MME 630 determines that the UE 650 is first-type UE by using the cell granularity.

When the UE moves from a first cell of the track area of the communications network to a second cell of the track area of the communications network, and the UE accesses the communications network from the second cell, the core network control plane node device determines that the UE is first-type UE.

For example, information about a dedicated network cell corresponding to the high-speed railway dedicated network in the track area is configured on the MME 630. The information about the dedicated network cell includes but is not limited to a cell identity of the dedicated network cell. The MME 630 may identify, according to multiple pieces of cell information of the UE 650 reported by a base station, whether the UE 650 is located in the dedicated network cell. When the MME 630 identifies that the UE 650 moves among multiple dedicated network cells, the MME 630 determines that the UE 650 is first-type UE.

(2) The MME 630 determines that the UE 650 is first-type UE by using the eNodeB granularity.

When the UE moves from a first base station of the track area of the communications network to a second base station of the track area of the communications network, and the UE accesses the communications network from the second base station, the core network control plane node device determines that the UE is first-type UE.

For example, information about a dedicated network eNodeB corresponding to the high-speed railway dedicated network in the track area is configured on the MME 630. The information about the dedicated network eNodeB includes but is not limited to an identity or an IP address of the dedicated network eNodeB. All signaling of the UE 650 is sent to the MME 630 by using an eNodeB. Therefore, the MME 630 may identify whether multiple eNodeBs that serve the UE 650 are dedicated network eNodeBs according to eNodeB information. When the MME 630 identifies that the multiple base stations that serve the UE 650 are dedicated network eNodeBs, the MME 630 determines that the UE 650 is first-type UE.

(3) The MME 630 determines that the UE 650 is first-type UE by using the TA granularity.

When the UE moves from a first tracking area TA of the track area of the communications network to a second tracking area TA of the track area of the communications network, and the UE accesses the communications network from the second tracking area TA, the core network control plane node device determines that the UE is first-type UE.

In this case, a dedicated network MME and a public network MME may be separately deployed, or a high-speed railway TA and a non-high-speed railway TA may be separately planned in one MME device. If all high-speed railway areas belong to one TA, whether the UE is first-type UE may be determined in the foregoing manner (1) or manner (2). Information about a dedicated network TAI corresponding to the high-speed railway dedicated network in the track area is configured on the MME 630. For example, a dedicated network TAI and a public network TAI may be distinguished by using TACs in the TAIs. When the UE 650 accesses the dedicated network in the track area, a service request procedure may be initiated due to a requirement or a TAU procedure or a handover procedure may be triggered due to a movement. The UE 650 or an eNodeB that serves the UE 650 reports a source TAI and a target TAI of the UE 650, or a new TAI and an old TAI to the MME 630 by using the TAU procedure, the service request procedure, the handover procedure, or the like. The MME 630 may identify whether both the source TAI and the target TAI, or the new TAI and the old TAI are dedicated network TAIs according to the source TAI and the target TAI, or the new TAI and the old TAI that are reported by the UE 650 or the eNodeB. When the MME 630 identifies that both the source TAI and the target TAI that are reported by the UE 650 are dedicated network TAIs, the MME 630 determines that the UE 650 is first-type UE.

(4) The core network control plane node device (for example, the MME 630) receives a notification message sent by a dedicated network base station, where the notification message is used to indicate that the UE is first-type UE, and the core network control plane node device determines that the UE is first-type UE according to the notification message.

For example, a dedicated network eNodeB that serves the UE 650 may determine, according to a speed measurement algorithm (for example, a Doppler shift algorithm) that the UE 650 is moving at a high speed, and further determine that the UE 650 in a connected state is first-type UE. After determining that the UE 650 in the connected state is first-type UE, the dedicated network eNodeB sends a notification message to the MME 630, so that the MME 630 determines that the UE 650 is first-type UE.

Optionally, when the MME 630 identifies that a dedicated network MMEC is configured on the first UE, the MME 630 determines that the first UE is first-type UE. For example, the UE 650 accesses the dedicated network in the railway station area, and a GUTI that includes a dedicated network MMEC is allocated to the UE. When the UE 650 enters the track area as the train moves, an access/service request message sent by the UE 650 to the MME 630 carries the GUTI that includes the dedicated network MMEC, and the MME 630 may identify that the UE 650 is first-type UE by using the reported dedicated network MMEC. In this case, the UE only needs to use the original dedicated network MMEC or the MME 630 updates the dedicated network MMEC.

Similarly, after performing step S702, and determining that the UE is first-type UE, the MME 630 allocates a dedicated network MMEC to the UE. However, for UE that initiates an access request (for example, a TAU request, an attach request, or a handover request) to the MME 630 by using a dedicated network eNodeB in the track area, before the MME 630 determines that the UE is first-type UE, the MME 630 first accepts the access request from the UE, and allows the UE to access the dedicated network.

Similarly, same as description from steps S603 to S607, after the MME 630 determines that the first UE is first-type UE, and allocates first GUTI that carries a dedicated network MMEC to the first UE, the MME 630 sends the first GUTI to the first UE 650. The first GUTI carries the dedicated network MMEC. Correspondingly, the first UE 650 receives the first GUTI sent by the MME 630. Therefore, when the first UE 650 accesses the public network by mistake due to an exception, an eNodeB 640 may instruct, according to the dedicated network MMEC, the UE to redirect to a cell of the communications network of the high-speed moving vehicle.

In the example of FIG. 3, optionally, after the MME 630 allocates and delivers the temporary identifier to the UE, the method may further include at least one of the following steps: S608, S709, or S710. S608 is not described herein again.

If first-type UE (for example, third UE) to which no dedicated network MMEC is allocated accesses the public network due to an exception, step S709 may be performed, so that the first-type UE accesses the communications network of the high-speed moving vehicle.

Optionally, S709 may be implemented by performing S709a or S709b.

S709a (not shown in the figure). The third UE accesses the high-speed railway dedicated network from an open cell.

A surrounding high-speed railway dedicated network cell is configured as a neighboring cell of the open cell, and it is set that a dedicated network frequency priority is higher than a public network frequency priority, so that UE can initiate a handover procedure or a reselection procedure to the dedicated network when passing through the open cell, so as to access the high-speed railway dedicated network. The open cell is usually set in an open area with fewer public network users in the high-speed railway line. Therefore, a large quantity of public network users can be prevented from being migrated to the dedicated network.

After the third UE accesses the high-speed railway dedicated network, the MME 630 determines that the third UE is first-type UE, and allocates a dedicated network MMEC to the third UE. A step in which the MME 630 determines that the third UE is first-type UE and allocates the dedicated network MMEC is the same as step S702b, and details are not described herein.

Step S709b is the same as step S609b, and details are not described herein.

Step S710 is used to migrate fourth UE out of the high-speed railway dedicated network. The fourth UE includes UE that actually is non-first-type UE, but accesses the dedicated network by mistake, and is allocated a dedicated network MMEC. For example, UE near the high-speed railway line may access the dedicated network in an attach procedure when being switched on, or non-first-type UE may access the dedicated network by means of network reselection due to an exception. UE of this type can be removed from the high-speed railway dedicated network by performing step S710, and becomes non-first-type UE. Optionally, step S710 includes step S710*a* or S710*b*.

S710*a*. The MME 630 determines that the fourth UE accessing the dedicated network by mistake is non-first-type UE, and therefore allocates a public network MMEC to the fourth UE.

For example, in step S710*a*, that the fourth UE is non-first-type UE may be determined by using description in step S610, and details are not described herein.

S710*b*. A dedicated network eNodeB measures a speed of UE in a connected state, determines that UE whose speed is less than a preset value and has no dedicated network MMEC is non-first-type UE, and therefore migrates the UE out of the high-speed railway dedicated network. For example, the UE is migrated out of the high-speed railway dedicated network in a handover manner.

Figure 4:
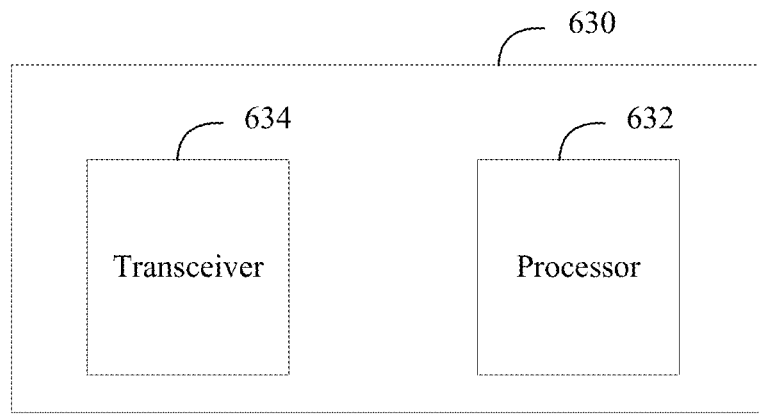
FIG. 4 is a block diagram of a core network control plane node device according to an embodiment of the present invention.

FIG. 4 is a block diagram of a core network control plane node device according to an embodiment of the present invention. The core network control plane node device in FIG. 4 may be used to perform method steps of the core network control plane node device (for example, the MME 630) in FIG. 2 or FIG. 3. The core network control plane node device includes a processor 632 and a transceiver 634.

The processor 632 is configured to determine that first UE accessing a communications network of a high-speed moving vehicle is first-type UE, and is configured to allocate a first temporary identifier to the first UE. The first temporary identifier includes a first sequence, and the first sequence is used to indicate that the first UE is first-type UE.

The transceiver 634 is configured to send the first temporary identifier to the first UE. When the first UE accesses a public network by mistake, the first sequence is used to instruct a base station of the public network to transfer the first UE to the communications network of the high-speed moving vehicle.

Specifically, in an embodiment, when the UE accesses the communications network of the high-speed moving vehicle from a tracking area TA of the communications network of the high-speed moving vehicle, the processor 632 is configured to determine that the UE is first-type UE.

Alternatively, when the UE accesses the communications network of the high-speed moving vehicle from a base station of the communications network of the high-speed moving vehicle, the processor 632 is configured to determine that the UE is first-type UE.

Alternatively, when the UE accesses the communications network of the high-speed moving vehicle from a cell of the communications network of the high-speed moving vehicle, the processor 632 is configured to determine that the UE is first-type UE.

In another embodiment, when the first UE accesses the communications network of the high-speed moving vehicle from a tracking area TA of a station area of the communications network of the high-speed moving vehicle, the processor 632 is configured to determine that the first UE is first-type UE.

Alternatively, when the first UE accesses the communications network of the high-speed moving vehicle from a base station of a station area of the communications network of the high-speed moving vehicle, the processor 632 is configured to determine that the first UE is first-type UE.

Alternatively, when the first UE accesses the communications network of the high-speed moving vehicle from a cell of a station area of the communications network of the high-speed moving vehicle, the processor 632 is configured to determine that the first UE is first-type UE.

Alternatively, when the first UE moves from a first tracking area TA of a track area of the communications network to a second tracking area TA of the track area of the communications network, and the first UE accesses the communications network of the high-speed moving vehicle from the second tracking area TA, the processor 632 is configured to determine that the first UE is first-type UE.

Alternatively, when the first UE moves from a first base station of a track area of the communications network to a second base station of the track area of the communications network, and the first UE accesses the communications network of the high-speed moving vehicle from the second base station, the processor 632 is configured to determine that the first UE is first-type UE.

Alternatively, when the first UE moves from a first cell of a track area of the communications network to a second cell of the track area of the communications network, and the first UE accesses the communications network of the high-speed moving vehicle from the second cell, the processor 632 is configured to determine that the first UE is first-type UE.

Alternatively, the transceiver 634 is configured to receive a notification message sent by the base station, where the notification message is used to indicate that the first UE is first-type UE. The processor 632 is configured to determine that the first UE is first-type UE according to the notification message.

Optionally, the transceiver 634 sends the first temporary identifier to the first UE in any one of the following manners:

(1) The transceiver 634 is configured to send a first temporary identifier reallocation message to the first UE, where the first temporary identifier reallocation message carries the first temporary identifier.

(2) The transceiver 634 is configured to send an attach accept message to the first UE, where the attach accept message carries the first temporary identifier.

(3) The transceiver 634 is configured to send a mobility management area update accept message to the first UE, where the mobility management area update accept message carries the first temporary identifier. The mobility management area update accept message includes any one of the following: a tracking area update accept message, a routing area update accept message, or a location area update accept message.

Optionally, the processor 632 is further configured to determine that second UE accessing the public network is not first-type UE, and is configured to allocate a third temporary identifier to the second UE. The third temporary identifier includes a third sequence, and the third sequence is used to indicate that the second UE is not first-type UE.

Figure 5:
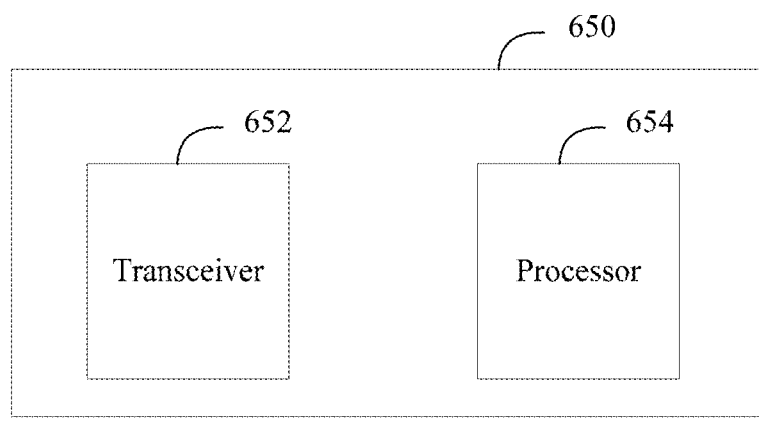
FIG. 5 is a block diagram of user equipment according to an embodiment of the present invention.

FIG. 5 is a block diagram of user equipment according to an embodiment of the present invention. For example, the user equipment in FIG. 5 may be used to perform method steps of the UE 650 in FIG. 2 or FIG. 3. The UE 650 includes a transceiver 652 and a processor 654.

After the UE accesses a communications network of a high-speed moving vehicle, the transceiver 652 is configured to receive a first temporary identifier sent by a core network control plane node device, where the first temporary identifier includes a first sequence, the first sequence is used to indicate that the UE is first-type UE, and the first-type UE is UE used by a user taking the high-speed moving vehicle.

After the UE accesses a public network by mistake, the processor 654 is configured to generate the radio resource control RRC setup request message that carries the first sequence.

The transceiver 652 is configured to send the RRC setup request message to a base station; and is further configured to receive an RRC connection release message sent by the base station, where the RRC connection release message is generated by the base station according to the first sequence, and the RRC connection release message is used to instruct the UE to access the communications network of the high-speed moving vehicle.

Figure 6:
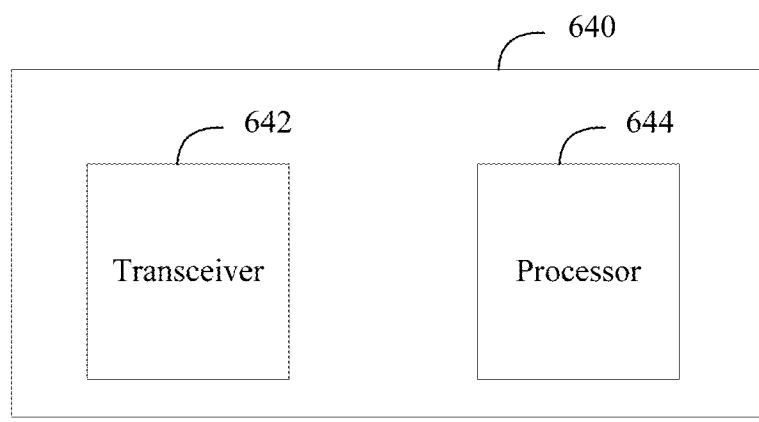
FIG. 6 is a block diagram of a base station according to an embodiment of the present invention.

FIG. 6 is a block diagram of a base station according to an embodiment of the present invention. For example, the base station in FIG. 6 may be used to perform method steps of the eNodeB 640 in FIG. 2 or FIG. 3. The eNodeB 640 includes a transceiver 642 and a processor 644.

The transceiver 642 is configured to receive a radio resource control RRC setup request message sent by user equipment UE.

The processor 644 is configured to determine whether the RRC setup request message carries a first sequence, where the first sequence is allocated to the UE after a core network control plane node device determines that the UE is first-type UE, and the first-type UE is UE used by a user taking the high-speed moving vehicle; and is further configured to generate an RRC connection release message according to the first sequence.

The transceiver 642 is further configured to send the RRC connection release message to the UE, where the RRC connection release message is used to instruct the UE to access a communications network of the high-speed moving vehicle.

An LTE network is used as an example for description in the foregoing description. However, the present invention is not limited thereto. The present invention is also applicable to a GSM network or a UMTS network. When the present invention is applied to the GSM network or the UMTS network, core network control plane node devices are an SGSN and an MSC. In the LTE network, a mobility management area is a TA, and correspondingly, in the 2G/3G network, the mobility management area is a routing area (RA for short) and a location area (LA for short). In addition, in the LTE network, a TAU procedure is caused due to a movement, and correspondingly, in the 2G/3G network, a routing area update (RAU for short) procedure and a location area update (LAU for short) procedure are caused.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for controlling a user equipment (UE) to access a communications network of a high-speed moving vehicle, the method comprising:
   determining, by a core network control plane node device, that a first UE accessing the communications network of the high-speed moving vehicle is a first-type UE, wherein the first-type UE is a UE used by a user taking the high-speed moving vehicle;
   allocating, by the core network control plane node device, a first temporary identifier to the first UE, wherein the first temporary identifier comprises a first sequence, and the first sequence is used to indicate that the first UE is a first-type UE; and
   sending, by the core network control plane node device, the first temporary identifier to the first UE, wherein when the first UE accesses a public network, the first sequence is used to instruct a base station to transfer the first UE to the communications network of the high-speed moving vehicle.

2. The method according to claim 1, wherein determining, by a core network control plane node device, that first UE accessing the communications network of the high-speed moving vehicle is a first-type UE comprises:
   when the UE accesses the communications network of the high-speed moving vehicle from a mobility management area of the communications network of the high-speed moving vehicle, determining, by the core network control plane node device, that the first UE is a first-type UE; or
   when the UE accesses the communications network of the high-speed moving vehicle from a base station of the communications network of the high-speed moving vehicle, determining, by the core network control plane node device, that the first UE is a first-type UE; or
   when the UE accesses the communications network of the high-speed moving vehicle from a cell of the communications network of the high-speed moving vehicle, determining, by the core network control plane node device, that the first UE is a first-type UE.

3. The method according to claim 1, wherein if the first UE accesses the communications network of the high-speed moving vehicle from a first area of the high-speed moving vehicle, determining, by a core network control plane node device, that the first UE is a first-type UE comprises:
   when the first UE accesses the communications network of the high-speed moving vehicle from a mobility management area of the first area, determining, by the core network control plane node device, that the first UE is a first-type UE; or
   when the first UE accesses the communications network of the high-speed moving vehicle from a base station of the first area, determining, by the core network control plane node device, that the first UE is a first-type UE; or
   when the first UE accesses the communications network of the high-speed moving vehicle from a cell of the first area, determining, by the core network control plane node device, that the first UE is a first-type UE.

4. The method according to claim 1, wherein if the first UE accesses the communications network of the high-speed moving vehicle from a second area of the high-speed moving vehicle, determining, by a core network control plane node device, that the first UE is a first-type UE comprises:
   when the first UE moves from a first mobility management area of the second area to a second mobility management area of the second area, and the first UE accesses the communications network from the second mobility management area, determining, by the core network control plane node device, that the first UE is a first-type UE; or when the first UE moves from a first base station of the second area to a second base station of the second area, and the first UE accesses the communications network from the second base station, determining, by the core network control plane node device, that the first UE is a first-type UE; or when the first UE moves from a first cell of the second area to a second cell of the second area, and the first UE accesses the communications network from the second cell, determining, by the core network control plane node device, that the first UE is a first-type UE; or receiving, by the core network control plane node device, a notification message sent by the base station, wherein the notification message is used to indicate that the first UE is first-type UE, and determining, by the core network control plane node device, that the first UE is a first-type UE according to the notification message.

5. The method according to claim 2, wherein the mobility management area comprises a tracking area (TA), a routing area (RA), or a location area (LA).

6. The method according to claim 1, wherein sending, by the core network control plane node device, the first temporary identifier to the first UE comprises:

sending, by the core network control plane node device, a first temporary identifier reallocation message to the first UE, wherein the first temporary identifier reallocation message carries the first temporary identifier; or sending, by the core network control plane node device, an attach accept message to the first UE, wherein the attach accept message carries the first temporary identifier; or sending, by the core network control plane node device, a mobility management area update accept message to the first UE, wherein the mobility management area update accept message carries the first temporary identifier.

7. The method according to claim 6, wherein the mobility management area update accept message comprises any one of the following: a tracking area update accept message, a routing area update accept message, or a location area update accept message.

8. The method according to claim 1, further comprising:
determining that the first UE is in the communications network of the high-speed moving vehicle; and
if the core network control plane node device that serves the first UE changes to a second core network control plane node device, allocating, by the second core network control plane node device, a second temporary identifier to the first UE, wherein the second temporary identifier comprises a second sequence, and the second sequence is used to indicate that the first UE is first-type UE.

9. The method according to claim 1, further comprising:
determining that a second UE accessing the public network is not a first-type UE; and
allocating, by the core network control plane node device, a third temporary identifier to the second UE, wherein the third temporary identifier comprises a third sequence, and the third sequence is used to indicate that the second UE is not a first-type UE.

10. The method according to claim 1, wherein the first temporary identifier comprises a globally unique temporary identity (GUTI), a temporary mobile subscriber identity (TMSI), or a packet temporary mobile subscriber identity (P-TMSI).

11. The method according to claim 1, wherein the first sequence comprises a mobility management entity code (MMEC) or a network resource identifier (NRI).

12. The method according to claim 1, wherein the high-speed moving vehicle comprises a high-speed railway train.

13. The method according to claim 1, wherein the core network control plane node device comprises a mobility management entity (MME), or a serving general packet radio service GPRS support node (SGSN), or a mobile switching center (MSC).

14. A core network control plane node device, comprising:
a processor, configured to:
determine that a first user equipment (UE) accessing a communications network of a high-speed moving vehicle is a first-type UE, wherein the first-type UE is a UE used by a user taking the high-speed moving vehicle, and
allocate a first temporary identifier to the first UE, wherein the first temporary identifier comprises a first sequence, and the first sequence is used to indicate that the first UE is a first-type UE; and
a transceiver, configured to send the first temporary identifier to the first UE, wherein when the first UE accesses a public network, the first sequence is used to instruct a base station to transfer the first UE to the communications network of the high-speed moving vehicle.

15. The core network control plane node device according to claim 14, wherein:
when the UE accesses the communications network of the high-speed moving vehicle from a mobility management area of the communications network of the high-speed moving vehicle, the processor is configured to determine that the first UE is a first-type UE; or
when the UE accesses the communications network of the high-speed moving vehicle from a base station of the communications network of the high-speed moving vehicle, the processor is configured to determine that the first UE is a first-type UE; or
when the UE accesses the communications network of the high-speed moving vehicle from a cell of the communications network of the high-speed moving vehicle, the processor is configured to determine that the first UE is a first-type UE.

16. The core network control plane node device according to claim 14, wherein:
when the first UE accesses the communications network of the high-speed moving vehicle from a mobility management area of a first area of the communications network of the high-speed moving vehicle, the processor is configured to determine that the first UE is a first-type UE; or
when the first UE accesses the communications network of the high-speed moving vehicle from a base station of a first area of the communications network of the high-speed moving vehicle, the processor is configured to determine that the first UE is a first-type UE; or
when the first UE accesses the communications network of the high-speed moving vehicle from a cell of a first area of the communications network of the high-speed moving vehicle, the processor is configured to determine that the first UE is a first-type UE.

17. The core network control plane node device according to claim 14, wherein:
when the first UE moves from a first mobility management area of a second area of the communications network to a second mobility management area of the second area of the communications network, and the first UE accesses the communications network from the second mobility management area, the processor is configured to determine that the first UE is a first-type UE; or when the first UE moves from a first base station of a second area of the communications network to a second base station of the second area of the communications network, and the first UE accesses the communications network from the second base station, the processor is configured to determine that the first UE is a first-type UE; or when the first UE moves from a first cell of a second area of the communications network to a second cell of the second area of the communications network, and the first UE accesses the communications network from the second cell, the processor is configured to determine that the first UE is a first-type UE; or the transceiver receives a notification message sent by the base station, wherein the notification message is used to indicate that the first UE is a first-type UE, and the processor is configured to determine that the first UE is a first-type UE according to the notification message.

18. The core network control plane node device according to claim 14, wherein:

the transceiver is configured to send a first temporary identifier reallocation message to the first UE, wherein the first temporary identifier reallocation message carries the first temporary identifier; or the transceiver is configured to send an attach accept message to the first UE, wherein the attach accept message carries the first temporary identifier; or the transceiver is configured to send a mobility management area update accept message to the first UE, wherein the mobility management area update accept message carries the first temporary identifier.

19. The core network control plane node device according to claim 14, wherein the processor is further configured to:

determine that a second UE accessing the public network is not a first-type UE; and allocate a third temporary identifier to the second UE, wherein the third temporary identifier comprises a third sequence, and the third sequence is used to indicate that the second UE is not a first-type UE.

20. The core network control plane node device claim 14, wherein:

the first temporary identifier comprises a globally unique temporary identity (GUTI), a temporary mobile subscriber identity (TMSI), or a packet temporary mobile subscriber identity (P-TMSI); and the first sequence comprises a mobility management entity code (MMEC) or a network resource identifier (NRI).

* * * * *